United States Patent [19]
Charbonneau et al.

[11] Patent Number: 6,063,495
[45] Date of Patent: May 16, 2000

[54] POLYESTER FIBER AND METHODS FOR MAKING SAME

[75] Inventors: Larry F. Charbonneau, Mendham; Garo Khanarian, Berkeley Heights; Robert E. Johnson, Hoboken, all of N.J.; Helmut B. Witteler, Beindersheim, Germany; John A. Flint, Berkeley Heights, N.J.

[73] Assignee: HNA Holdings, Inc., Warren, N.J.

[21] Appl. No.: 09/064,719

[22] Filed: Apr. 23, 1998

[51] Int. Cl.[7] .............................. D02G 3/00; C08G 63/66
[52] U.S. Cl. .................. 428/364; 528/176; 528/190; 528/194; 528/195; 528/198; 528/275; 528/298; 528/300; 528/302; 528/307; 528/308; 528/308.6; 524/81; 524/779; 264/176.1; 264/177.1; 264/177.13; 264/210.1; 264/211.12; 264/211.14; 428/373
[58] Field of Search ................................ 528/176, 190, 528/194, 195, 198, 275, 298, 300, 302, 307, 308, 308.6; 524/81, 779; 264/176.1, 177.1, 177.13, 210.1, 211.12, 211.14; 428/364, 373

[56] References Cited

U.S. PATENT DOCUMENTS

| | | |
|---|---|---|
| 2,985,995 | 5/1961 | Bunting, Jr. et al. . |
| 3,199,281 | 8/1965 | Maerov et al. . |
| 3,684,766 | 8/1972 | Jackson, Jr. et al. . |
| 3,785,993 | 1/1974 | Langhans . |
| 3,795,627 | 3/1974 | Langhans et al. . |
| 3,859,445 | 1/1975 | Langhans . |
| 3,871,947 | 3/1975 | Brekken . |
| 3,966,867 | 6/1976 | Munting . |
| 4,146,663 | 3/1979 | Ikeda et al. . |
| 4,157,419 | 6/1979 | Mirhej . |
| 4,159,617 | 7/1979 | Allan . |
| 4,195,161 | 3/1980 | Davis et al. . |
| 4,209,559 | 6/1980 | Wada et al. . |
| 4,223,128 | 9/1980 | Halek et al. . |
| 4,225,549 | 9/1980 | Allan . |
| 4,231,922 | 11/1980 | Robeson . |
| 4,246,381 | 1/1981 | Robeson . |
| 4,255,301 | 3/1981 | Minagawa et al. . |
| 4,259,458 | 3/1981 | Robeson . |
| 4,259,478 | 3/1981 | Jackson, Jr. et al. . |
| 4,294,956 | 10/1981 | Berger et al. . |
| 4,294,957 | 10/1981 | Berger et al. . |
| 4,351,917 | 9/1982 | Calundann et al. . |
| 4,352,927 | 10/1982 | Cogswell et al. . |
| 4,355,080 | 10/1982 | Zannucci . |
| 4,374,239 | 2/1983 | Berger et al. . |
| 4,383,051 | 5/1983 | Meyborg et al. . |
| 4,383,923 | 5/1983 | Elfert . |
| 4,386,186 | 5/1983 | Maresca et al. . |
| 4,408,061 | 10/1983 | Salzburg et al. . |
| 4,413,116 | 11/1983 | Reuter et al. . |
| 4,418,174 | 11/1983 | Dhein et al. . |
| 4,435,562 | 3/1984 | Sullivan et al. . |
| 4,438,226 | 3/1984 | Dirlikov et al. . |
| 4,439,586 | 3/1984 | Kawakami et al. . |
| 4,443,563 | 4/1984 | Dirlikov et al. . |
| 4,456,729 | 6/1984 | Dhein et al. . |
| 4,474,918 | 10/1984 | Seymour et al. . |
| 4,506,066 | 3/1985 | Medem et al. . |
| 4,506,086 | 3/1985 | Salzburg et al. . |
| 4,526,923 | 7/1985 | Hornbaker et al. . |
| 4,551,520 | 11/1985 | Morris et al. . |
| 4,557,982 | 12/1985 | Nouda et al. . |
| 4,564,645 | 1/1986 | Salzburg et al. . |
| 4,587,071 | 5/1986 | Minami et al. . |
| 4,605,729 | 8/1986 | Barnes et al. . |
| 4,663,415 | 5/1987 | Grögler et al. . |
| 4,687,830 | 8/1987 | Weber et al. . |
| 4,713,436 | 12/1987 | Downs et al. . |
| 4,725,647 | 2/1988 | Maresca et al. . |
| 4,805,788 | 2/1989 | Akiho . |
| 4,814,426 | 3/1989 | Utsumi et al. . |
| 4,863,046 | 9/1989 | Collette et al. . |
| 4,993,566 | 2/1991 | Eberle . |
| 4,993,567 | 2/1991 | Eberle, Jr. . |
| 5,005,716 | 4/1991 | Eberle . |
| 5,021,289 | 6/1991 | Light et al. . |
| 5,108,675 | 4/1992 | Matsuo et al. . |
| 5,120,822 | 6/1992 | Hoeschele et al. . |

(List continued on next page.)

FOREIGN PATENT DOCUMENTS

| | | |
|---|---|---|
| 0 033089A2 | 8/1981 | European Pat. Off. . |
| 0102 596 A2 | 3/1984 | European Pat. Off. . |
| 96/38282 | 12/1996 | European Pat. Off. . |
| 96/38498 | 12/1996 | European Pat. Off. . |
| 97/00284 | 1/1997 | European Pat. Off. . |
| 1263981 | 3/1968 | Germany . |
| 3229412 A1 | 2/1984 | Germany . |
| 4415353 A1 | 11/1994 | Germany . |
| 195 19 577 | 5/1995 | Germany . |
| 195 19 578 | 5/1995 | Germany . |
| 195 28 336 | 8/1995 | Germany . |
| 195 04 913 | 8/1996 | Germany . |
| 195 38 700 | 4/1997 | Germany . |
| 52018832A | 7/1975 | Japan . |
| 1079686 | 8/1967 | United Kingdom . |
| 1354446 | 5/1974 | United Kingdom . |
| 1408036 | 10/1975 | United Kingdom . |

OTHER PUBLICATIONS

Chemical Abstracts vol. 62, col. 10588, Neth. App. 6,405, 497 (1965).

*Encyclopaedic Dictionary of Commercial Polymer Blends*, Ed. L.A. Utracki, ChemTec Publishing, pp. 10–11, 23, 35–43 (1994).

(List continued on next page.)

*Primary Examiner*—Samuel A. Acquah
*Attorney, Agent, or Firm*—Burns, Doane, Swecker & Mathis, L.L.P.

[57] ABSTRACT

A polyester fiber made from a polymer having ethylene glycol moieties, isosorbide moieties and terepthaloyl moieties, and the method of making the fiber is described. The polyester fiber is used to form articles suitable for commercial, especially textile, and industrial uses, and has an inherent viscosity of at least 0.35 dL/g when measured as a 1% (weight/volume) solution of the polyester in o-chlorophenol at a temperature of 25° C.

36 Claims, No Drawings

U.S. PATENT DOCUMENTS

| | | |
|---|---|---|
| 5,124,388 | 6/1992 | Pruett et al. |
| 5,141,120 | 8/1992 | Brown et al. |
| 5,141,121 | 8/1992 | Brown et al. |
| 5,153,302 | 10/1992 | Masuda et al. |
| 5,164,478 | 11/1992 | Lee et al. |
| 5,179,143 | 1/1993 | König et al. |
| 5,296,550 | 3/1994 | Natarajan et al. |
| 5,321,056 | 6/1994 | Carson et al. |
| 5,382,474 | 1/1995 | Adhya et al. |
| 5,409,967 | 4/1995 | Carson et al. |
| 5,412,005 | 5/1995 | Bastioli et al. |
| 5,484,632 | 1/1996 | Mercer, Jr. et al. |
| 5,496,887 | 3/1996 | Braune . |
| 5,596,888 | 1/1997 | McLarty, III et al. |
| 5,607,757 | 3/1997 | Dalton . |
| 5,616,404 | 4/1997 | Sublett . |
| 5,646,236 | 7/1997 | Schafheutle et al. |
| 5,648,152 | 7/1997 | Diaz-Kotti et al. |
| 5,654,083 | 8/1997 | Venema . |
| 5,656,719 | 8/1997 | Stibal et al. |
| 5,709,929 | 1/1998 | Venema . |
| 5,721,397 | 2/1998 | Weinberg . |
| 5,747,175 | 5/1998 | Dietz et al. |
| 5,766,679 | 6/1998 | Siemensmeyer et al. |

OTHER PUBLICATIONS

"Plastics processing," *McGraw–Hill Encyclopedia of Science & Technology*, 6$^{th}$ Edition, pp. 35–40 (1987).

"Plastics Processing," *The Way Things Work*, vol. 2, pp. 56–59 (1971).

*Polymer Alloys and Blends: Thermodynamics and Rheology*, Ed. L.A. Utracki, Hanser Publishers, pp. 256–270, 275–280, 287–293, 297–299 (1990).

*Polymeric Materials Encyclopedia*, "Polyesters (Derived from Renewable Sources)" vol. 8, pp. 5891–5896, CPC Press, Inc. (1996).

Dietrich Braun and Matthias Bergmann "1,4:3,6–Dianhydrohexite als Bausteine Für Polymere" J. prakt. Chem. 334, p. 298–310 (1992).

Hans R. Kricheldorf, "'Sugar Diols' as Building Blocks of Polycondensates," J.M.S.—Rev. Macromol. Chem. Phys., C37(4), pp. 599–631 (1997).

Reinhard Storbeck, Matthias Rehahn and Matthias Ballauff, "Synthesis and properties of high–molecular–weight polyesters based on 1,4:3,6–dianhydrohexitols and terephthalic acid," Makromol. Chem. 194, pp. 53–64 (1993).

Reinhard Storbeck, "Synthese und Charakterisierung von Polyesetern auf Basis nachwachsender Rohstoffe," Dissertation, Universität Karlsruhe, 1994.

Reinhard Storbeck and Matthias Ballauff, "Synthesis and Thermal Analysis of Copolyesters Deriving from 1,4:3,6–Dianhydrosorbitol, Ethylene Glycol, and Terephthalic Acid," Journal of Applied Polymer Science, vol. 59, pp. 1199–1202 (1996).

D. Braun et al., "Polyesters with 1.4:3.6–dianhydrosorbitol as polymeric plasticizers for PVC," Die Angewandte Makromolekulare Chemie 199, pp. 191–205 (1992).

D. Braun et al., "Grafting of polyesters by free–radical chain transfer," Die Angewandte Makromolekulare Chemie 210, pp. 173–196 (1993).

Estelle Cognet–Georjon et al., "New polyurethanes based on diphenylmethane diisocyanate and 1,4:3,6–dianhydrosorbitol, 1," Macromol. Chem. Phys. 196, pp. 3733–3751 (1995).

Estelle Cognet–Georjon et al., "New polyurethanes based on 4,4'–diphenylmethane diisocyanate and 1,4:3,6 dianhydrosorbitol, 2$^{a)}$" Macromol. Chem. Phys. 197, pp. 3593–3612 (1996).

Hans R. Kricheldorf et al., "Chiral thermotropic copoly(ester–imide)s based on isosorbide$^{b)}$ and N–(4–carboxyphenyl)trimellitimide," Macromol. Rapid Commun. 16, pp. 231–237 (1995).

Hans R. Kricheldorf et al., "New Polymer Syntheses. LXXXII. Syntheses of Poly(ether–sulfone)s from Silylated Aliphatic Diols Including Chiral Monomers," Journal of Polymer Science: Part A: Polymer Chemistry, vol. 33, pp. 2667–2671 (1995).

Hans R. Kricheldorf et al., "LC–polyimides 26. Photoreactive, nematic or cholesteric poly(ester–imide)s derived from 4–aminocinnamic acid trimellitimide, isosorbide and various diphenols," High Perform. Polym., 7, pp. 471–480 (1995).

Hans R. Kricheldorf et al., "Cholesteric and photoreactive polyesters," Reactive & Functional Polymers, 30, pp. 173–189 (1996).

Mustapha Majdoub et al., Nouveaux Polyéthers Et Polyesters À Base D'Isosorbide: Synthèse Et Caractérisation, Eur. Polym. J., vol. 30, No. 12, pp. 1431–1437 (1994).

Masahiko Okada et al., "Synthesis and biodegradability of polyesters based on 1,4:3,6–dianhydrohexitols and sucinic acid derivatives," in *Biodegradable Plastics and Polymers*, Eds. Y. Doi and K. Fukada, Elsevier Science B.V., pp. 511–518 (1994).

Masahiko Okada et al., "Synthesis and Degradabilities of Polyesters from 1,4:3,6–Dianhydrohexitols and Aliphatic Dicarboxylic Acids," Journal of Polymer Science: Part A: Polymer Chemistry, vol. 33, pp. 2813–2820 (1995).

Masahiko Okada et al., "Biodegradable Polymers Based on Renewable Resources: Polyesters Composed of 1,4:3,6–Dianhydrohexitol and Aliphatic Dicarboxylic Acid Units," Journal of Applied Polymer Science, vol. 62, pp. 2257–2265 (1996).

Martin Reinecke and Helmut Ritter, "Branching and crosslinking of an unsaturated oligoester with furfurylamides and sorbic acid amides via Diels–Alder additions," Makromol. Chem. 194 pp. 2385–2393 (1993).

Joachim Thiem et al., "Synthesis of Polyterephthalates Derived from Dianhydrohexitols," Polymer Bulletin 11, pp. 365–369 (1984).

J. Thiem et al., "Darstellung und gezielte Polykondensation von Anhidroalditol–Bausteinen aus Stärke", starch/stärke, 36, Nr.5, pp. 170–176 (1984).

Sirinat Wilbullucksanakul et al., "Synthesis of polyurethanes from saccharide–derived diols and diisocyantes and their hydrolyzability," Macromol. Chem., Phys. 197, pp. 135–146 (1996).

V.L. Lapenkov et al., "Polyvinyl ethers of dianhydro derivatives of mannitol and sorbitol," Ref. Zh., Khim. 1973, Abstr. No. 15S298.

Stanislaw Ropuszynski et al., "Preparation of oxyethylene derivates of esters of dianhydroglucitol and some higher fatty acids and study of their properties," Abstract; Pr. Nauk. Inst. Technol. Org. Tworzyw Sztucznych Politech. Wroclaw., No. 3, pp. 15–38 (1971) with Abstract.

POLYESTER FIBER AND METHODS FOR MAKING SAME

RELATED APPLICATIONS

The following copending applications, filed on even date herewith, contain related subject matter: U.S. application Ser. Nos. 08/064,844, 09/086,064, 09/064,846, 09/064,858, 09/064,826, 09/064,862, and 09/064,720. The content of the above-identified applications are hereby incorporated by reference.

FIELD OF THE DISCLOSURE

This disclosure relates to a polyester fiber, methods of making the same, and articles made therefrom. In particular, this disclosure relates to a fiber of polyester wherein the polyester has an isosorbide moiety, terephthaloyl moiety and ethylene glycol moiety, methods of making the same, and articles made therefrom.

BACKGROUND OF THE INVENTION

Polyester fibers are produced in large quantities for use in a variety of applications. In particular, these fibers are desirable for use in textiles, particularly in combination with natural fibers such as cotton and wool. Clothing, rugs and other items may be fashioned from these fibers. Further, polyester fibers are desirable for use in industrial applications due to their elasticity and strength. In particular, they are used to make articles such as tire cords and ropes.

The term "fibers" as used herein is meant to include continuous monofilaments, non-twisted or entangled multifilament yarns, staple yarns, spun yarns and non-woven materials. Such fibers may be used to form uneven fabrics, knitted fabrics, fabric webs, or any other fiber-containing structures, such as tire cords.

Synthetic fibers, such as nylon, acrylic, polyesters and others, are made by spinning and drawing the polymer into a filament, which is then formed into a yarn by winding many filaments together. These fibers are often treated mechanically and/or chemically to impart desirable characteristics such as strength, elasticity, heat resistance, hand (feel of fabric) and the like as known in the art based on the desired end product to be fashioned from the fibers.

The polymers currently used for fiber formation are generally based on completely man-made or synthetic molecules. In contrast, the diol 1,4:3,6-dianhydro-D-sorbitol, referred to hereinafter as isosorbide, the structure of which is illustrated below, is readily made from renewable resources, such as sugars and starches. For example, isosorbide can be made from D-glucose by hydrogenation followed by acid-catalyzed dehydration.

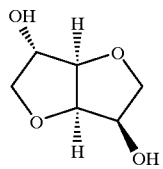

Isosorbide has been incorporated as a monomer into polyesters that also include terephthaloyl moieties. See, for example, R. Storbeck et al, *Makromol. Chem.*, Vol. 194, pp. 53–64 (1993); R. Storbeck et al, *Polymer*, Vol. 34, p. 5003 (1993). However, it is generally believed that secondary alcohols such as isosorbide have poor reactivity and are sensitive to acid-catalyzed reactions. See, for example, D. Braun et al., *J. Prakt.Chem.*, Vol. 334, pp. 298–310 (1992). As a result of the poor reactivity, polyesters made with an isosorbide monomer and esters of terephthalic acid are expected to have a relatively low molecular weight. Ballauff et al, Polyesters (Derived from Renewable Sources), Polymeric Materials Encyclopedia, Vol. 8, p. 5892 (1996).

Copolymers containing isosorbide moieties, ethylene glycol moieties, and terephthaloyl moieties have been reported only rarely. A copolymer containing these three moieties, in which the mole ratio of ethylene glycol to isosorbide was about 90:10, was reported in published German Patent Application No. 1,263,981 (1968). The polymer was used as a minor component (about 10%) of a blend with polypropylene to improve the dyeability of polypropylene fiber. It was made by melt polymerization of dimethyl terephthalate, ethylene glycol, and isosorbide, but the conditions, which were described only in general terms in the publication, would not have given a polymer having a high molecular weight.

Copolymers of these same three monomers were described again recently, where it was observed that the glass transition temperature Tg of the copolymer increases with isosorbide monomer content up to about 200° C. for the isosorbide terephthalate homopolymer. The polymer samples were made by reacting terephthaloyl dichloride in solution with the diol monomers. This method yielded a copolymer with a molecular weight that is apparently higher than was obtained in the German Patent Application described above, but still relatively low when compared against other polyester polymers and copolymers. Further, these polymers were made by solution polymerization and were thus free of diethylene glycol moieties as a product of polymerization. See R. Storbeck, Dissertation, Universität Karlsruhe (1994); R. Storbeck, et al., *J. Appl. Polymer Science*, Vol.59, pp. 1199–1202 (1996).

U.S. Pat. No. 4,418,174 describes a process for the preparation of polyesters useful as raw materials in the production of aqueous stoving lacquers. The polyesters are prepared with an alcohol and an acid. One of the many preferred alcohols is dianhydrosorbitol. However, the average molecular weight of the polyesters is from 1,000 to 10,000, and no polyester actually containing a dianhydrosorbitol moiety was made.

U.S. Pat. No. 5,179,143 describes a process for the preparation of compression molded materials. Also, described therein are hydroxyl containing polyesters. These hydroxyl containing polyesters are listed to include polyhydric alcohols, including 1,4:3,6-dianhydrosorbitol. Again, however, the highest molecular weights reported are relatively low, i.e. 400 to 10,000, and no polyester actually containing the 1,4:3,6-dianhydrosorbitol moiety was made.

Published PCT Application WO 97/14739 and WO 96/25449 describe cholesteric and nematic liquid crystalline polyesters that include isosorbide moieties as monomer units. Such polyesters have relatively low molecular weight and are not isotropic.

SUMMARY OF THE DISCLOSURE

Contrary to the teachings and expectations that have been published in the prior art, isotropic, i.e., semi-crystalline and amorphous or nonliquid crystalline, copolyesters containing terephthaloyl moieties, ethylene glycol moieties, isosorbide moieties and, optionally, diethylene glycol moieties, are readily synthesized in molecular weights that are suitable for making fabricated products such as fibers on an industrial scale. Further, fibers made from these polyesters offer improved strength, elasticity and abrasion resistance. In particular, such fibers show good potential for use in textiles, and may be useful in industrial applications as well.

The process conditions for producing the polyester fiber, particularly the amounts of monomers used in the polyester, are desirably chosen so that the final polymeric product used for manufacturing fibers contains the desired amounts of the various monomer units, preferably with equimolar amounts of monomer units derived from a diol and a diacid. Because of the volatility of some of the monomers, including isosorbide, and depending on the method of manufacture of the polyester, some of the monomers are desirably included in excess at the beginning of the polymerization reaction and removed as the reaction proceeds. This is particularly true of ethylene glycol and isosorbide.

The polyester may be formed by any method known in the art. Preferably, however, the polyester is formed by solvent or melt polymerization. The choice of method may be determined by the desired amount of diethylene glycol in the final product.

In a preferred embodiment, the number of terephthaloyl moieties in the polymer is in the range of about 25% to about 50 mole % (mole % of the total polymer). The polymer may also include amounts of one or more other aromatic diacid moieties such as, for example, those derived from isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid at combined levels up to about 25 mole % (mole % of the total polymer).

In a preferred embodiment, ethylene glycol monomer units are present in amounts of about 5 mole % to about 49.75 mole %. The polymer may also contain diethylene glycol moieties. Depending on the method of manufacture, the amount of diethylene glycol moieties is in the range of about 0.0 mole % to about 25 mole %.

In a preferred embodiment, isosorbide is present in the polymer in amounts in the range of about 0.25 mole % to about 40 mole %. One or more other diol monomer units may also be included in amounts up to a total of about 45 mole %.

The polyester has an inherent viscosity, which is an indicator of molecular weight, of at least about 0.35 dL/g, as measured on a 1% (weight/volume) solution of the polymer in o-chlorophenol at a temperature of 25° C. A higher inherent viscosity, such as at least about 0.40 dL/g, preferably at least about 0.50 dL/g, is desired for optimal fiber formation for use in commercial applications, such as textile manufacture. Further processing of the polyester may achieve inherent viscosities up to about 2.0 dL/g and even higher, which can be useful for the formation of fibers for both commercial uses and industrial purposes, such as tire cords, cables and the like.

The polyester fibers of the present invention are suitable for use in textile manufacture or other commercial applications, and for use in industrial applications. They may be woven or knitted to form fabrics, or may be provided in the form of continuous monofilaments, multifilament yarns or staple yarns.

DETAILED DESCRIPTION OF THE PREFERRED EMBODIMENTS OF THE DISCLOSURE

The polyester fiber and a method of manufacturing the same are described in detail below. In particular, the method of manufacturing a polyester comprising terephthaloyl moieties, ethylene glycol moieties and isosorbide moieties is described, as well as the process of forming fibers from such a polymer for use in commercial or industrial applications.

In a preferred embodiment, ethylene glycol monomer units are present in the polymer in amounts of about 33 mole % to about 49.9 mole %, preferably 37 mole % to about 45 mole %, although higher amounts may be included as necessary to achieve the desired results. The polymer composition may also contain diethylene glycol monomer units. Depending on the method of manufacture, the amount of diethylene glycol monomer units is in the range of from about 0.0 mole % to about 5.0 mole %, preferably 0.25 mole % to about 5 mole %, although higher amounts may be included as necessary to achieve the desired results. Diethylene glycol may be produced as a by-product of the polymerization process, or may be added directly to the composition to help accurately regulate the amount of diethylene glycol monomer units that are in the polymer.

In preferred embodiments, isosorbide moieties are present in the polymer in amounts in the range of from about 0.10 mole % to about 10 mole %, preferably from about 0.25 mole % to about 5.0 mole %, although higher amounts may be included as necessary to achieve the desired results. Isosorbide is most preferably present in the range of 1 mole% to 3 mole %. One or more other diol monomer units may optionally be included in amounts up to a total of about 2.0 mole %, but preferably less than 1 mole %. The amount of other diols included may however be higher as necessary to achieve the desired results. Examples of the optional other diol units include aliphatic alkylene glycols having from 3–12 carbon atoms and having the empirical formula $HO-C_nH_{2n}-OH$, where n is an integer from 3–12, including branched diols such as 2,2-dimethyl-1,3-propanediol; cis or trans-1,4-cyclohexanedimethanol and mixtures of the cis and trans isomers; triethylene glycol; 2,2-bis[4-(2-hydroxyethoxy)phenyl] propane; 1,1-bis[4-(2-hydroxyethoxy)phenyl]cyclohexane; 9,9-bis[4-(2-hydroxyethoxy)phenyl]fluorene; 1,4:3,6-dianhydromannitol; 1,4:3,6-dianhydroiditol; and 1,4-anhydroerythritol.

Terephthaloyl moieties in the polyester may range from 25–50 mole %, but are preferably in the range of from about 40–50 mole %, although higher amounts may be included as necessary to achieve the desired results. Other aromatic diacid moieties in the polymer, if desired, may include, for example, those derived from isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid, at combined levels up to about 10 mole %, preferably between 0.01 and 5 mole % of the total polymer, although higher amounts may be included as necessary to achieve the desired results.

It is preferable that equimolar amounts of diacid monomer units and diol monomer units are present in the polymer in order to achieve a high molecular weight and high inherent viscosity, which provide a lower shrinkage rate and higher glass transition temperature ($T_g$) than, for example, poly (ethylene terephthalate). The polyester formed has an inherent viscosity, which is an indicator of molecular weight, of at least about 0.35 dL/g, as measured on a 1% (weight/volume) solution of the polymer in o-chlorophenol at a temperature of 25° C. Preferably, the inherent viscosity is at least about 0.45 dL/g. Most preferably, an inherent viscosity of about 0.5–1.5 is desired.

The molecular weight is normally not measured directly. Instead, the inherent viscosity of the polymer in solution or the melt viscosity is used as an indicator of molecular weight. For the present polymers, the inherent viscosity is measured by the method described previously, with a molecular weight corresponding to an inherent viscosity of about 0.35 dL/g or more. Higher molecular weights corresponding to inherent viscosities of at least about 0.45 dL/g are preferred for commercial applications, and molecular weights corresponding to inherent viscosities of about 0.8 dL/g to 2.0 dL/g, and even higher are desired for industrial uses. Generally, the inherent viscosity/molecular weight relationship can be fitted to the linear equation:

$$\log(IV) = 0.586 \times \log(M_w) - 2.9672.$$

The inherent viscosities are a better indicator of molecular weight for comparisons of samples and are used as the indicator of molecular weight herein.

The polyesters used to make the fibers of the invention can be made by any of several methods. The product compositions vary somewhat depending on the method used, particularly in the amount of diethylene glycol residue that is present in the polymer. These methods include the reaction of the diol monomers with the acid chlorides of terephthalic acid and any other acids that may be present. The reaction of terephthaloyl dichloride with isosorbide and ethylene glycol is readily carried out by combining the monomers in a solvent (e.g., toluene) in the presence of a base, such as pyridine, which neutralizes HCl as it is produced. This procedure is described in R. Storbeck et al., *J. Appl. Polymer Science,* Vol. 59, pp. 1199–1202 (1996). Other well-known variations using terephthaloyl dichloride may also be used (e.g., interfacial polymerization), or the monomers may simply be stirred together while heating.

When the polymer is made using the acid chlorides, the ratio of monomer units in the product polymer is about the same as the ratio of reacting monomers. Therefore, the ratio of monomers charged to the reactor is about the same as the desired ratio in the product. A stoichiometric equivalent of the diol and diacids generally will be used to obtain a high molecular weight polymer.

The polymers can also be made by a melt polymerization process, in which the acid component is either terephthalic acid or dimethyl terephthlate, and also may include the free acid or dimethyl ester of any other aromatic diacids that may be desired in the polyester polymer composition. The diacids or dimethyl esters are heated with the diols (ethylene glycol, isosorbide, optional diols) in the presence of a catalyst to a high enough temperature that the monomers combine to form esters and diesters, then oligomers, and finally polymers. The polymeric product at the end of the polymerization process is a molten polymer. The diol monomers (e.g., ethylene glycol and isosorbide) are volatile and distill from the reactor as the polymerization proceeds. Therefore, an excess of these diols is desirably charged to the reaction to obtain a polymer, and the amounts must be adjusted according to the characteristics of the polymerization vessel, such as the efficiency of the distillation column and the efficiency of monomer recovery and recycle. Such modifications in the amounts of monomers and the like in accordance with the characteristics of a reactor are readily made by practitioners in the art. Further, skilled practitioners can readily determine the amount of each component desirably charged to any particular reactor to form the polymer of the invention.

The above described melt polymerization process is the preferred method of making the polymer and is described in detail in copending commonly assigned U.S. Application No. 09/064,844, incorporated herein by reference. The melt polymerization processes using dimethyl terephthalate and terephthalic acid are also summarized below.

Dimethyl Terephthalate Process

In this process, which is carried out in two stages, terephthalic acid and the optional diacid monomers, if present, are used as their dimethyl ester derivatives. The diols (e.g., ethylene glycol and isosorbide) are mixed with the dimethyl ester of the aromatic diacid (e.g., dimethyl terephthalate) in the presence of an ester interchange catalyst, which causes exchange of the ethylene glycol for the methyl group of the dimethyl esters through a transesterification reaction. This results in the formation of methanol, which distills out of the reaction flask, and bis (2-hydroxyethylterephthalate). Because of the stoichiometry of this reaction, somewhat more than two moles of ethylene glycol are desirably added as reactants for the ester interchange reaction.

Catalysts that bring about ester interchange include salts (usually acetates) of the following metals: Li, Ca, Mg, Mn, Zn, Pb, and combinations thereof, $Ti(OR)_4$, where R is an alkyl group having 2–12 carbon atoms, and PbO. The catalyst components are generally included in an amount of about 10 ppm to about 100 ppm. Preferred catalysts for ester interchange include $Mn(OAc)_2$, $Co(OAc)_2$, and $Zn(OAc)_2$, where OAc is the abbreviation for acetate, and combinations thereof. The polycondensation catalyst used in the second stage of the reaction, preferably Sb(III) oxide, may be added initially or at the start of the polycondensation stage. A catalyst that has been used with particularly good success is based on salts of Mn(II) and Co(II), used in the amount of about 50 to about 100 ppm each. These are preferably used in the form of Mn(II) acetate tetrahydrate and Co(II) acetate tetrahydrate, although other salts of the same metals may also be used.

Ester interchange is desirably brought about by heating and stirring the mixture of reactants under an inert atmosphere (e.g., nitrogen) at atmospheric pressure from room temperature to a temperature high enough to induce the ester interchange (about 150° C.). Methanol is formed as a by-product and distills out of the reactor. The reaction is gradually heated to about 250° C. until methanol evolution stops. The end of methanol evolution can be recognized by a drop in the overhead temperature of the reaction vessel.

A small amount of an additive having a boiling point of 170–240° C. may be added to the ester interchange to aid in the heat transfer within the reaction medium and to help retain volatile components in the vessel that may sublime into the packed column. The additive must be inert and not react with alcohols or dimethyl terephthalate at temperatures below 300° C. Preferably, the additive has a boiling point greater than 170° C., more preferably within the range of 170° C. to 240° C., and is used in an amount between about 0.05 and 10 wt %, more preferably between about 0.25 and 1 wt % of the reaction mixture. A preferred additive is tetrahydronaphthalene. Other examples include diphenyl ether, diphenyl sulfone and benzophenone. Other such solvents are described in U.S. Pat. No. 4,294,956, the contents of which are hereby incorporated by reference.

The second stage of the reaction is commenced by adding a polycondensation catalyst if it was not added at the beginning of the process, and a sequestering agent for the transesterification catalyst. Polyphosphoric acid is an example of a sequestering agent and is normally added in an amount of about 10 to about 100 ppm of phosphorous per gram of dimethyl terephthalate. An example of a polycondensation catalyst is antimony (III) oxide, which may be used at a level of 100 to about 400 ppm.

The polycondensation reaction is typically carried out at a temperature from about 250° C. to 285° C. During this time, ethylene glycol distills out of the reaction due to condensation of the bis(2-hydroxyethyl) terephthalate to form polymer and by-product ethylene glycol, which is collected as a distillate.

The polycondensation reaction described above is preferably carried out under vacuum, which can be applied while the reactor is being heated to the temperature of the polycondensation reaction after polyphosphoric acid and Sb(III) oxide have been added. Alternatively, vacuum can be applied after the polycondensation reaction temperature reaches 280° C.–285° C. In either case, the reaction is accelerated by the application of vacuum. Heating under vacuum is continued until the molten polymer reaches the desired molecular weight, usually recognized by an increase in the melt viscosity to a predetermined level. This is observed as an increase in the torque needed for the stirring motor to maintain stirring. An inherent viscosity of at least 0.5 dL/g, and generally up to about 0.65 dL/g or greater, can be achieved by this melt polymerization process without further efforts at raising molecular weight. For certain composition ranges, the molecular weight can be increased further by solid state polymerization, described below.

Terephthalic Acid Process

The terephthalic acid process is similar to the dimethyl terephthalate process except that the initial esterification reaction that leads to bis(2-hydroxy-ethylterephthalate) and other low molecular weight esters is carried out at a slightly elevated pressure (autogenous pressure, about 25 to 50 psig). Instead of a two-fold excess of diols, a smaller excess (about 10% to about 60%) of diols (ethylene glycol, isosorbide and other diols, if any) is used. The intermediate esterification product is a mixture of oligomers, since not enough diol is present to generate a diester of terephthalic acid. The catalysts are also different. No added catalyst is necessary in the esterification reaction.

A polycondensation catalyst (e.g., Sb(III) or Ti(IV) salts) is still desirable to achieve a high molecular weight polymer. The catalyst that is needed to achieve a high molecular weight can be added after the esterification reaction, or it can be conveniently charged with the reactants at the beginning of the reaction. Catalysts that are useful for making a high molecular weight polymer directly from terephthalic acid and the diols include the acetate or other alkanoate salts of Co(II) and Sb(UII), oxides of Sb(III) and Ge(IV), and Ti(OR)$_4$ (where R is an alkyl group having 2 to 12 carbon atoms), as well as glycol solubilized metal oxides. The use of these and other catalysts in the preparation of polyesters is well-known in the art.

The reaction may be carried out in discrete steps, but this is not necessary. In practice on a large scale, it may be carried out in steps as the reactants and intermediate products are pumped from reactor to reactor at increasing temperatures. In a batch process, the reactants and catalyst may be charged to a reactor at room temperature and then gradually heated to about 285° C. as the polymer forms. The pressure is vented in the range of about 200° C. to about 250° C., and a vacuum is then desirably applied.

Esterification to form bis(2-hydroxyethylterephthalate) esters and oligomers takes place at elevated temperatures (between room temperature and about 220° C. to 265° C. under autogenous pressure), and the polymer is made at temperatures in the range of about 275° C. to about 285° C. under a high vacuum (less than 10 Torr, preferably less than 1 Torr). The vacuum is needed to remove residual ethylene glycol, isosorbide and water vapor from the reaction to raise the molecular weight.

A polymer having an inherent viscosity of at least 0.5 dL/g, and generally up to about 0.65 dL/g, can be achieved by the direct polymerization process, without subsequent solid state polymerization. The progress of the polymerization can be followed by the melt viscosity, which is easily observed by the torque that is required to maintain stirring of the molten polymer at a constant rpm.

Solid State Polymerization

Polymers can not be made by the melt condensation process described above having an inherent viscosity of about 0.65 dL/g or greater without further treatment. Compositions of ethylene glycol, isosorbide, and terephthalic acid having isosorbide in an amount of about 0.25% to about 10% on a mole basis may have their molecular weight increased further by solid state polymerization. The product made by melt polymerization, after extruding, cooling, and pelletizing, is essentially non-crystalline. The material can be made semi-crystalline by heating it to a temperature in the range of about 115° C. to about 140° C. for an extended period of time (about 2 to about 12 hours). This induces crystallization so that the product can then be heated to a much higher temperature to raise the molecular weight. The process works best for low levels of isosorbide, from about 0.25 mole % to about 3 mole %, because the polyester crystallizes more easily with low levels of isosorbide.

The polymer may also be crystallized prior to solid state polymerization by treatment with a relatively poor solvent for polyesters, such as acetone, which induces crystallization. Such solvents reduce the glass transition temperature T($_g$), allowing for crystallization. Solvent induced crystallization is known for polyesters and is described in U.S. Pat. Nos. 5,164,478 and 3,684,766, which are hereby incorporated by reference.

The crystallized polymer is subjected to solid state polymerization by placing the pelletized or pulverized polymer into a stream of an inert gas, usually nitrogen, or under a vacuum of 1 Torr, at an elevated temperature, above 140° C. but below the melting temperature of the polymer, for a period of about two to 16 hours. Solid state polymerization is generally carried out at a temperature in the range of about 190° to about 210° C. for a period of about two to about 16 hours. Good results are obtained by heating the polymer to from about 195° to about 198° C. for about 10 hours. This solid state polymerization may raise the inherent viscosity to about 0.8 dL/g or higher.

Fiber Production

The monomer composition of the polyester polymer is desirably chosen to result in a partially crystalline polymer. This crystallinity is desirable for the formation of fibers, providing strength and elasticity. As first produced, the polyester is mostly amorphous in structure. In preferred embodiments, the polyester polymer readily crystallizes on reheating and/or extension of the polymer.

In the process of the invention, fibers are made from the polymer by any process known in the art. Generally, however, melt spinning is preferred for polyester fibers.

Melt spinning, which is most commonly used for polyesters such as poly(ethylene terephthalate), comprises heating the polymer to form a molten liquid, or melting the polymer against a heated surface. The molten polymer is forced through a spinneret with a plurality of fine holes. Upon contact with air or a non-reactive gas stream after passing through the spinneret, the polymer solution from each spinneret solidifies into filaments. The filaments are gathered together downstream from the spinneret by a convergence guide, and may be taken up by a roller or a plurality of rollers. This process allows filaments of various sizes and cross sections to be formed, including filaments having a round, elliptical, square, rectangular, lobed or dog-boned cross section, for example.

Following the extrusion and uptake of the fiber, the fiber is usually drawn, thereby increasing the crystallization and maximizing desirable properties such as orientation along the longitudinal axis, which increases elasticity, and strength. The drawing may be done in combination with takeup by using a series of rollers, some of which are generally heated, as known in the art, or may be done as a separate stage in the process of fiber formation.

The polymer may be spun at speeds of from about 600 to 6000 meters per minute or higher, depending on the desired fiber size. For textile applications, a fiber with a denier per filament of from about 0.1 to about 100 is desired. Preferably, the denier is about 0.5 to 20, more preferably 0.7 to 10. However, for industrial applications the fiber should be from about 0.5 to 100 denier per filament, preferably about 1.0 to 10.0, most preferably 3.0 to 5.0 denier per filament. The required size and strength of a fiber is application specific, however, and the appropriate size of the fiber can readily be determined by one of ordinary skill in the art for any given application.

The resulting filamentary material is amenable to further processing through the use of additional processing equipment, or it may be used directly in applications requiring a continuous filament textile yarn. If desired, the filamentary material subsequently may be converted from a flat yarn to a textured yarn through known false twist texturing conditions or other processes known in the art. In particular, it is desirable to increase the surface area of the fiber to provide a softer feel and to enhance the ability of the fibers to breathe, thereby providing better insulation and water retention in the case of textiles, for example. The fibers may therefore be crimped or twisted by the false twist method, air jet, edge crimp, gear crimp or stuffer box, for example. Alternatively, the fibers may be cut into shorter lengths, called staple, which may be processed into a yarn. A skilled artisan can determine the best method of crimping or twisting based on the desired application and the composition of the fiber.

After formation, the fibers are finished by any method appropriate to the desired final use. In the case of textiles, this may include dyeing, sizing or addition of chemical agents such as antistatic agents, flame retardants, UV light stabilizers, antioxidants, pigments, dyes, stain resistants, antimicrobial agents and the like, which are appropriate to adjust the look and hand of the fibers. For industrial applications, the fibers may be treated to impart additional desired characteristics such as strength, elasticity or shrinkage, for example.

The continuous filament fiber of the invention may be used either as produced or texturized for use in a variety of applications such as textile fabrics for apparel and home furnishings, for example. High tenacity fiber can be used in industrial applications such as high strength fabrics, tarpaulins, sail cloth, sewing threads and rubber reinforcement for tires and V-belts, for example.

The staple fiber of the invention may be used to form a blend with natural fibers, especially cotton and wool. In particular, the polyester is a chemically resistant fiber which is generally resistant to mold, mildew, and other problems inherent to natural fibers. The polyester fiber further provides strength and abrasion resistance and lowers the cost of material. Therefore, it is ideal for use in textiles and other commercial applications, such as for use in fabrics for apparel, home furnishings and carpets.

Further, the polyester polymer of the invention may be used with another synthetic polymer to form a heterogenous fiber, thereby providing a fiber with improved properties. Polymers which may be used include those listed in copending application Ser. Nos. 09/064,826 and 09/064,720. The heterogeneous fiber may be formed in any suitable manner, such as side-by-side, sheath-core and matrix designs, as known in the art.

The polyester polymer of the invention may also be used to form a blend which may be used to produce a fiber having improved properties. Examples of polymers which may be blended with the polyester polymer of the invention are those found for example in co-pending application Ser. Nos. 09/064,826 and 09/064,720.

Further, the fiber may itself be made by any method known in the art using isosorbide-containing polyesters such as those described in copending application Ser. Nos. 09/064,826 and 09/064,720.

The fiber of the invention, its manufacture and properties are further illustrated by the following non-limiting examples.

EXAMPLES

The polymer molecular weights are estimated based on inherent viscosity (I.V.), which is measured for a 1% solution (wt/volume) of polymer in o-chlorophenol at a temperature of 25° C. The levels of catalyst components are expressed as parts per million (ppm), based on a comparison of the weight of the metal with the weight of either the dimethyl terephthalate or terephthalic acid, depending on which monomer is used.

Example 1

A) Polymerization

The following polymerization reactants are added to a 4-liter polymerization flask fitted with a jacketed Vigreux column approximately 14 inches long and ⅝ inch in diameter with air cooling, a mechanical stirrer, and a water-cooled condenser: dimethyl terephthalate (780.1 g), isosorbide (62.6 g), and ethylene glycol (504.7 g), which corresponds to a mole ratio of 1: 0.106: 2.13. A catalyst of Mn(II) acetate tetrahydrate (0.296 g), Co(II) acetate tetrahydrate (0.297 g), and Sb(III) oxide (0.308 g) is also charged. This corresponds to 85 ppm manganese (weight of metal as a fraction of the weight of dimethyl terephthalate), 90 ppm cobalt, and 330 ppm antimony. The flask is purged with a stream of nitrogen while the temperature is raised to 250° C. over a period of two hours, using a fluidized sand bath as a heating medium. Methanol is continuously collected as the reaction is heated above approximately 150° C. By noting when the temperature drops at the top of the Vigreux column, it is possible to determine the end of methanol evolution, indicating the finish of the first step of the reaction, which is the transesterification of the diols and dimethyl terephthalate. At this point, 91 ppm of phosphorous is added in the form of a polyphosphoric acid solution in ethylene glycol. In this case, 0.244 g of polyphosphoric acid mixed with approximately 1 ml of ethylene glycol is used. Also at this time, the nitrogen purge is stopped. Heating is continued while a vacuum is gradually applied. The attainment of full vacuum, preferably less than 1 Torr, takes approximately 1 hour. During this hour, the reaction mixture is heated to 285° C. Also during this time, ethylene glycol distills off, and a low molecular weight polymer forms. The molten polymer is heated under vacuum at 285° C. for about 2 hours, or until the polymer achieves sufficient melt viscosity, as determined by an increase in torque of the stirrer. When sufficient viscosity is achieved, the polymerization is stopped, and the flask is removed from the sand bath.

The cooled polymer is removed from the flask and ground. The solution inherent viscosity (I.V.) of the material is 0.44 dL/g. The monomer unit composition of the polymer, determined by proton NMR, is about 3% isosorbide, 44% ethylene gylcol, 3% diethylene glycol, and 50% terephthalic acid, all expressed as a mole % of the polymer, as shown in Table 1. It is noteworthy that the amount of isosorbide in the polymer is approximately half of the amount that was charged, when compared with the amount of terephthalic acid. Unreacted isosorbide was found in the distillates, especially in the ethylene glycol. The amount of isosorbide in the polymer by this process thus is very dependent on the efficiency of the distillation or other separation methods that are used in the process. A skilled practitioner can readily establish specific process details according to the characteristics of the reactor, distillation columns and other equipment used.

B) Fiber Making

The above produced polymer was ground and dried at 130° C. overnight in a vacuum oven. Rods were made from the polymer by first placing it in a mold which was then heated under gentle pressure from a plunger. The pressure was provided by a hydraulic press. When the polymer began to soften, more pressure (500–1000 lbs/in$^2$) was applied to compress the polymer into a hard rod. The ingress of moisture was reduced by encasing the equipment in a Lucite® box which was continuously purged by a flow of dry nitrogen.

Spinning was immediately carried out on a single filament spinning machine. The polymer in rod form was melted by pressing it against a heated "grid" which was conical in shape with a hole at the apex. The machine temperatures were slowly raised until the melted polymer started to flow through this hole. In the present example, this occurred at 287° C. The polymer was then filtered through a bed of 80/120 shattered metal, and finally emerged from the single hole spinneret capillary, 0.020" diameter and 0.030" long. The throughput was 0.30 grams per minute (gpm), and the fiber, which was to be drawn, was taken up at 50 meters per minute (mpm). These conditions were found to give low orientation single filaments of about 69 denier per filament (dpf). A temperature scan was made to produce the optimum spun fiber for subsequent drawing. A fiber sample was also made at the maximum take up speed possible in order to obtain a feel for draw down and to measure the spun fiber properties. In the present case that speed was 2500 mpm.

Single filament drawing was performed on modular draw units with hot shoes between each roll. The fiber was drawn in two stages using the second stage to develop the maximum fiber tenacity and crystallinity. The hot shoe temperatures used in the present example were 90° C. and 160° C. In this way, a single filament was collected and small samples cut from the last roll. A sample was tested for its tensile properties using ASTM test method D3822. The tests were conducted on a three inch gauge length at 60% strain, and the results are exhibited in Table 1.

Examples 2–13

The conditions used to spin and draw similar fibers 2–13 from other polymer compositions of the invention, as well as the resulting tensile properties, are also presented in Table 1. Further, comparative examples using compositions of poly (ethylene terephthalate) are presented in Table 1. These polymer fibers were produced and spun in the same manner as Example I using the conditions set forth in Table 1.

Table 2 provides additional data regarding birefringence and orientation of the drawn fibers of Examples 1A and B, 2A, 3A, 4A, 8B, 9A and B, 10A, 11A and Comparative Examples 1 and 2, which are poly(ethylene terephthalate). The birefringence of the fibers was measured by x-ray scattering with a Leitz Orthoplane Polarized Light Microscope with a Berek tilt type microscope. The orientation of the fibers was measured by X-ray scattering from the crystalline phase with a Rigaku Rotating Type generator having a two dimensional (2D) position sensitive detector using Kα radiation. The measurement of birefringence divided by orientation is a measure of the normalized birefringence of the fiber independent of the draw ratio and orientation.

It is to be understood that the above described embodiments are illustrative only and that modification throughout may occur to one skilled in the art. Accordingly, this invention is not to be regarded as limited to the embodiments disclosed herein.

TABLE 1

| Example | % ISOS Charged to Reaction | Spun fiber properties | | | | | | Drawn fiber properties | | | | | | | Shrinkage | | Resin Analysis | | | | | |
|---|---|---|---|---|---|---|---|---|---|---|---|---|---|---|---|---|---|---|---|---|---|---|
| | | Extrusion Temp (°C) | Take-up Speed (mpm) | DPF | Tenacity (gpd) | Elongation (%) | Modulus (gpd) | Draw Ratio | DPF | tenacity (gpd) | Elongation (%) | Modulus (gpd) | Hot shoe temp (°C) 1 | Hot shoe temp (°C) 2 | Onset Tmp (°C) | % | Tg (°C) | Tmp (°C) | IV (dL/g) | HNMR mol % ISOS | HNMR mol % EG | HNMR mol % DEG |
| Comp. 1A | 0 | 287 | 75 | 66 | 0.5 | 3 | 22 | 7.3 | 9.6 | 9 | 7.8 | 154 | 90 | 160 | 66.3 | 7.17 | 80 | 245 | .54 | — | 49.3 | 0.7 |
| Comp. 1B | | 287 | 2900 | 0.6 | 2.5 | 117 | 43 | | | | | | | | | | | | | | | |
| 1A | 5% | 287 | 50 | 69 | 0.5 | 3.5 | 18 | 7.1 | 9.3 | 7.2 | 8.3 | 110 | 90 | 160 | 83.1 | 5.96 | 86 | 234 | 0.44 | 3.2 | 43.95 | 2.9 |
| 1B | | 287 | 75 | 73 | 0.5 | 3.5 | 18 | 7.1 | 10.6 | 6.6 | 7.5 | 126 | 90 | 160 | | | | | | | | |
| 1C | | 287 | 2500 | 0.8 | 2.1 | 113 | 28 | | | | | | | | | | | | | | | |
| 2A | 6% | 288 | 50 | 68 | 0.5 | 3.4 | 20 | 7.5 | 9.3 | 6.7 | 7.4 | 125 | 90 | 160 | 87.6 | 4.68 | 89 | 225 | 0.51 | 4.3 | 43.3 | 2.3 |
| 2B | | 288 | 3000 | 0.7 | 1.9 | 71 | 34 | | | | | | | | | | | | | | | |
| 3A | 7% | 287 | 75 | 70 | 0.5 | 3.2 | 20 | 7.3 | 9.6 | 6.6 | 7.2 | 133 | 90 | 160 | 90.1 | 5.39 | 91 | 224 | 0.53 | 4.45 | 42.7 | 2.85 |
| 3B | | 287 | 2500 | 0.9 | 2.4 | 84 | 31 | | | | | | | | | | | | | | | |
| 4A | 10% | 287 | 75 | 68 | 0.5 | 3.6 | 20 | 7.5 | 9.3 | 4.9 | 6.4 | 103 | 90 | 160 | 90.1 | 4.41 | 93 | N.A. | 0.49 | 7.25 | 39.1 | 3.65 |
| 4B | | 287 | 2550 | 0.8 | 2.3 | 58 | 32 | | | | | | | | | | | | | | | |
| 5A | 6% | 277 | 25 | 78 | 0.5 | 3.6 | 19 | 7.6 | 9.9 | 7.7 | 8.4 | 128 | | | | | | | | | | |
| 5B | | 277 | 2500 | 0.9 | 2 | 94 | 32 | | | | | | | | | | | | | | | |
| 6A | 6% | 277 | 25 | 67 | 0.5 | 174 | 19 | 7.6 | 9.5 | 7.7 | 8.0 | 123 | 100 | 180 | | | 89 | | 0.55 | | | |
| 6B | | 278 | 1800 | 1.4 | 2 | 77 | 44 | | | | | | | | | | | | | | | |
| 7A | 6% | 278 | 50 | 62 | 0.5 | 3.2 | 19 | 7.4 | 8 | 9.1 | 8.5 | 137 | 100 | 180 | | | 89 | | 0.49 | 4.2 | 42.65 | 3.25 |
| 7B | | 277 | 1400 | 1.6 | 1.7 | 62 | 35 | | | | | | | | | | | | | | | |
| Comp. 2A | 0 | 277 | 25 | 52 | 0.5 | 3.6 | 19 | 7.4 | 10.4 | 8.6 | 8.3 | 131 | 100 | 180 | | | 80 | 245 | 0.81 | | | |
| Comp. 2B | | 277 | 2000 | 1 | 2.1 | 132 | 33 | | | | | | | | | | | | | | | |
| 8A | 12% | 261 | 25 | 74 | 0.5 | 3.3 | 19 | 7 | 10.3 | 6.4 | 8.0 | 129 | 90 | 130 | 74.7 | 10 | 95 | N.A. | 0.6 | 5.5 | 42.9 | 1.1 |
| 8B | | 261 | 50 | 72 | 0.5 | 3.4 | 20 | 6.8 | 10.9 | 6.5 | 7.6 | 126 | 90 | 130 | | | | | | | | |
| 8C | | 260 | 75 | 75 | 0.5 | 3.2 | 20 | 6.6 | 11.5 | 6.5 | 7.8 | 123 | 90 | 130 | | | | | | | | |
| 8D | | 260 | 1400 | 1.35 | 2 | 70 | 38 | | | | | | | | | | | | | | | |
| 9A | 18.3% | 250 | 30 | | | | | 6.3 | 16.7 | 2 | 42 | 36 | 115 | none | | | 97 | | 0.4 | | | |
| 9B | | 250 | 120 | | | | | 8.1 | 10.2 | 2.5 | 21.4 | 65 | 115 | 120 | | | | | | | | |
| 10A | 24.5% | 281 | 25 | 65 | 0.5 | 75 | 18 | 6.9 | 11 | 4.3 | 12.9 | 68 | 100 | 130 | | | 107 | | 0.56 | | | |
| 10B | | 281 | 50 | 74 | 0.7 | 342 | 18 | 6.7 | 11.7 | 4.3 | 12.9 | 70 | 100 | 130 | | | | | | | | |
| 10C | | 281 | 75 | 70 | 0.8 | 351 | 18 | 6.2 | 10.7 | 4.3 | 13.3 | 62 | 100 | 130 | | | | | | | | |
| 11A | 36% | 267 | 25 | 76 | 0.5 | 285 | 19 | 6.2 | 12.8 | 1.7 | 51 | 24 | 130 | 140 | | | 118 | | 0.48 | | | |
| 11B | | 267 | 50 | 72 | 0.5 | 258 | 18 | 5.9 | 12.4 | 2.5 | 20 | 41 | 130 | 135 | | | | | | | | |
| 12A | 36% | 243 | 25 | 78 | 0.8 | 281 | 21 | 5.5 | 13.9 | 1.5 | 8 | 45 | 120 | none | | | 110 | | 0.43 | 13.9 | 32.3 | 3.4 |
| 12B | | 243 | 50 | 75 | 0.7 | 331 | 22 | 7 | 11.4 | 1.8 | 27 | 35 | 130 | none | | | | | | | | |
| 12C | | 243 | 75 | 73 | 0.7 | 324 | 22 | 7.8 | 9.3 | 1.8 | 11 | 42 | 130 | none | | | | | | | | |
| 12D | | 243 | 1000 | 1.8 | 2.6 | 50 | 28 | | | | | | | | | | | | | | | |
| 13A | 36% | 292 | 25 | 151 | 0.6 | 167 | 21 | 5 | 35.1 | 1.6 | 28 | 31 | 180 | none | 141 | | 0.46 | 26.6 | 21.4 | 1.6 | | |
| 13B | | 293 | 50 | 33.4 | 0.6 | 136 | 24 | 2.8 | 15.4 | 1.2 | 30 | 29 | 160 | none | | | | | | | | |
| 13C | | 293 | 75 | 48.2 | 0.6 | 139 | 21 | 2.9 | 24.8 | 1.3 | 28 | 29 | 160 | none | | | | | | | | |
| 13D | | 294 | 425 | 4.4 | 1.34 | 48 | 21 | | | | | | | | | | | | | | | |

TABLE 2

| EXAMPLE | isosorbide mole % charged | mass fraction isos | draw ratio | birefringence | orientation | biref/orien | mod (gpd) | tenacity | elong % |
|---|---|---|---|---|---|---|---|---|---|
| Comp Ex 1* | 0 | 0.478 | 7.3 | 0.2 | 0.982 | 0.203666 | 154 | 9 | 7.8 |
| Ex 1A | 5 | 7.188 | 7.1 | 0.185 | 0.981 | 0.188583 | 110 | 7.2 | 8.3 |
| Ex 1B | 5 | 7.188 | 7.1 | 0.186 | 0.977 | 0.190379 | 126 | 6.6 | 7.5 |
| Ex 2A | 6 | 8.5084 | 7.5 | 0.184 | 0.976 | 0.188525 | 125 | 6.7 | 7.4 |
| Ex 3A | 7 | 9.8216 | 7.3 | 0.177 | 0.971 | 0.182286 | 133 | 6.6 | 7.2 |
| Ex 4A | 10 | 13.718 | 7.5 | 0.151 | 0.967 | 0.156153 | 103 | 4.9 | 6.4 |
| Ex 8B | 12 | 16.2796 | 6.8 | 0.162 | 0.955 | 0.169 | 126 | 6.5 | 7.6 |
| Ex 9A | 18 | 23.7916 | 6.0 | 0.064 | 0.509 | 0.125737 | 36 | 2 | 42 |
| Ex 9B | 18 | 23.7916 | 8.0 | 0.073 | 0.843 | 0.086 | 65 | 2.5 | 21.4 |
| 10A | 24.5 |  | 6.5 | 0.129 | 0.97 | 0.132 | 66 | 4.1 | 13 |
| 11A | 36 |  | 6.0 | 0.084 | 0.49 | 0.171429 | 32 | 2.1 | 35 |

*PET

What is claimed is:

1. A fiber comprising a polyester, wherein said polyester comprises terephthaloyl moieties; optionally, one or more other aromatic diacid moieties; ethylene glycol moieties; isosorbide moieties; and, optionally one or more other diol moieties, wherein said polyester has an inherent viscosity of at least about 0.35 dL/g when measured as a 1% (weight/volume) solution of said polyester in o-chlorophenol at a temperature of 25° C.

2. The fiber according to claim 1, wherein said terephthaloyl moieties are derived from terephthalic acid or dimethyl terephthalate.

3. The fiber according to claim 1, wherein the polyester further comprises diethylene glycol moieties.

4. The fiber according to claim 1, wherein said one or more other diol moieties are derived from aliphatic alkylene glycols or branched aliphatic glycols having from 3–12 carbon atoms and having the empirical formula $HO-C_nH_{2n}-OH$, where n is an integer from 3–12; cis or trans-1,4-cyclohexanedimethanol or mixtures thereof; triethylene glycol; 2,2-bis[4-(2-hydroxyethoxy)phenyl]propane; 1,1-bis[4-(2-hydroxyethoxy)phenyl]cyclohexane; 9,9-bis[4-(2-hydroxyethoxy)-phenyl]fluorene; 1,4:3,6-dianhydromannitol; 1,4:3,6-dianhydroiditol; or 1,4-anhydroerythritol.

5. The fiber according to claim 4, wherein said other diol moieties are derived from cis-1,4-cyclohexanedimethanol, trans-1,4-cyclohexanedimethanol, or mixtures thereof.

6. The fiber according to claim 1, wherein said optional one or more aromatic diacid moieties are derived from isophthalic acid, 2,5-furandicarboxylic acid, 2,5-thiophenedicarboxylic acid, 2,6-naphthalenedicarboxylic acid, 2,7-naphthalenedicarboxylic acid, or 4,4'-bibenzoic acid.

7. The fiber according to claim 6, wherein said one or more other aromatic diacid moieties are derived from isophthalic acid, 2,6-naphthalenedicarboxylic acid, 4,4'-bibenzoic acid, or mixtures thereof.

8. The fiber according to claim 1, wherein said inherent viscosity is from about 0.45 to 1.0 dL/g.

9. The fiber according to claim 8, wherein said inherent viscosity is from about 0.50 dL/g to 0.70 dL/g.

10. The fiber according to claim 1, wherein said terephthaloyl moieties are present in an amount of from about 40 to 50 mole % of said polyester, said other aromatic diacid moieties are present in an amount of from about 0.1 to 10.0 mole % of the polyester, said ethylene glycol moieties are present in an amount of from about 33 to 49.9 mole % of said polyester, said isosorbide moieties are present in an amount of from about 0.25 to 10.0 mole % of said polyester, and said other diol moieties are present in an amount of up to about 2.0 mole % of said polyester.

11. The fiber according to claim 10, wherein said other diol moieties are diethylene glycol moieties in an amount up to about 5.0 mole % of said polyester.

12. The fiber according to claim 1, having an initial modulus of from about 20 to 150 gpd.

13. The fiber according to claim 1, having a denier per filament of from about 0.5 to 20.

14. The fiber according to claim 1, having a cross section selected from the group consisting of circular, elliptical, square, rectangular, crescent-shaped, multi-lobed and dog-boned.

15. A method of making a fiber, wherein the fiber comprises a polyester, said method comprising:
 a) forming the polyester;
 b) spinning the polyester into a fiber; and
 c) drawing the spun fiber;
 wherein the polyester comprises terephthaloyl moieties; optionally, other aromatic diacid moieties; ethylene glycol moieties; isosorbide moieties; and, optionally, one or more other diol moieties; wherein said polyester has an inherent viscosity of at least about 0.35 dL/g when measured as a 1% (weight/volume) solution of said polyester in o-chlorophenol at a temperature of 25° C.

16. The method according to claim 15, wherein forming the polyester comprises:
 (a) combining in a reactor a monomer comprising a terephthaloyl moiety; optionally, one or more other monomers containing an aromatic diacid moiety; a monomer comprising an ethylene glycol moiety; a monomer comprising an isosorbide moiety; and optionally, one or more other monomers comprising a diol moiety with a condensation catalyst suitable for condensing aromatic diacids and glycols; and
 (b) heating said monomers and said catalyst to a temperature sufficient to polymerize said monomers into a polyester polymer having at least a terephthaloyl moiety, ethylene glycol moiety and isosorbide moiety; wherein said heating is continued for a sufficient time to yield a polyester having an inherent viscosity of at least about 0.35 dL/g when measured as a 1% (weight/volume) solution of said polyester in o-chlorophenol at a temperature of 25° C.

17. The method according to claim 16, wherein heating said monomers further includes stirring said monomers with the concurrent removal of by-products by distillation and/or evaporation.

18. The method according to claim 16, wherein said monomer comprising a terephthaloyl moiety is terephthalic acid.

19. The method according to claim 18, wherein water and unreacted monomer are removed while said monomers polymerize.

20. The method according to claim 16, wherein said monomer comprising a terephthaloyl moiety is dimethyl terephthalate.

21. The method according to claim 20, wherein methanol and unreacted monomer are removed while said monomers polymerize.

22. The method according to claim 15, wherein said one or more optional other diol moieties are derived from aliphatic alkylene glycols or branched aliphatic glycols having from 3–12 carbon atoms and having the empirical formula HO-$C_nH_{2n}$-OH, where n is an integer from 3–12; cis or trans-1,4-cyclohexanedimethanol or mixtures thereof; triethylene glycol; 2,2-bis[4-(2-hydroxyethoxy)phenyl] propane; 1,1-bis[4-(2-hydroxyethoxy) phenyl] cyclohexane; or 9,9-bis[4-(2-hydroxyethoxy)phenyl]fluorene.

23. The method according to claim 15, wherein said optional other aromatic diacid moieties are derived from isophthalic acid, 2,5-furandicarboxylic acid, 2,5-thiophenedicarboxylic acid, 2,6-naphthalenedi-carboxylic acid, 2,7-naphthalenedicarboxylic acid, or 4,4'-bibenzoic acid.

24. The method according to claim 16, wherein said terephthaloyl moieties are present in an amount of about 40 to 50 mole % of said polyester, said optional other aromatic diacid moieties are present in an amount up to about 10 mole % of said polyester, said ethylene glycol moieties are present in an amount of about 33 to 49.9 mole % of the polyester, said isosorbide moieties are present in an amount of about 0.25 to 10.0 mole % of said polyester, and said one or more other diol moieties are present in an amount up to about 2.0 mole % of said polyester.

25. The method according to claim 24, wherein said one or more other diol moieties are diethylene glycol moieties in an amount of up to about 5.0 mole % of said polyester.

26. The method according to claim 16, further comprising increasing the molecular weight of said polyester by solid state polymerization.

27. The method according to claim 26, wherein said solid state polymerization comprises:

(a) crystallizing said polyester by heating said polyester to a temperature in the range of about 115° C. to about 140° C.; and (b) heating said polyester under vacuum or in a stream of inert gas at an elevated temperature above 140° C. but below the melting temperature of said polyester to yield a polyester having an increased inherent viscosity.

28. The method according to claim 27, wherein said heating step (b) is carried out at a temperature of about 195° to 198° C. for about 10 hours.

29. The method according to claim 27, wherein said increased inherent viscosity is at least about 0.65 dL/g.

30. The method according to claim 15, wherein spinning the polyester into fiber comprises:

a) melting said polyester;

b) extruding said molten polyester through a spinning orifice; and c) cooling said extruded polyester, thereby forming a fiber.

31. The method according to claim 15, wherein drawing the spun fiber comprises:

a) heating the spun fiber;

b) exerting tension on the heated spun fiber, thereby stretching the heated spun fiber; and c) collecting and cooling the stretched fiber.

32. A staple blend, comprising the fiber of claim 1 and at least one other fiber selected from the group consisting of synthetic fibers, cotton fiber and wool fiber.

33. An article comprising the staple blend of claim 32.

34. An article made from the fiber of claim 1.

35. The article according to claim 34, wherein the article is selected from a textile fabric, high strength industrial fabric, sewing threads, and cording for rubber reinforcement.

36. The article according to claim 34, wherein the fiber size is from about 0.5 to 20 dpf.

* * * * *